Patented June 16, 1936

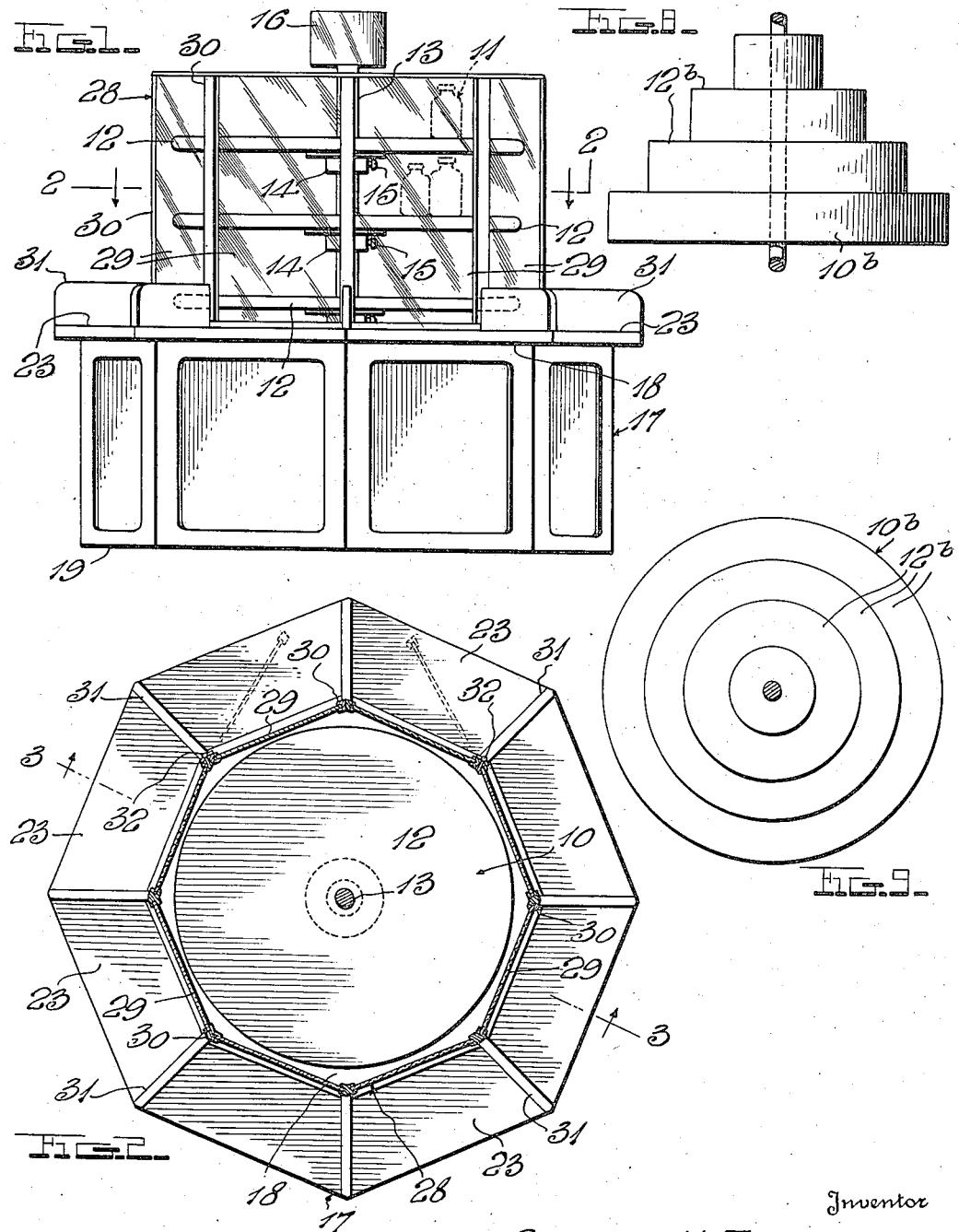

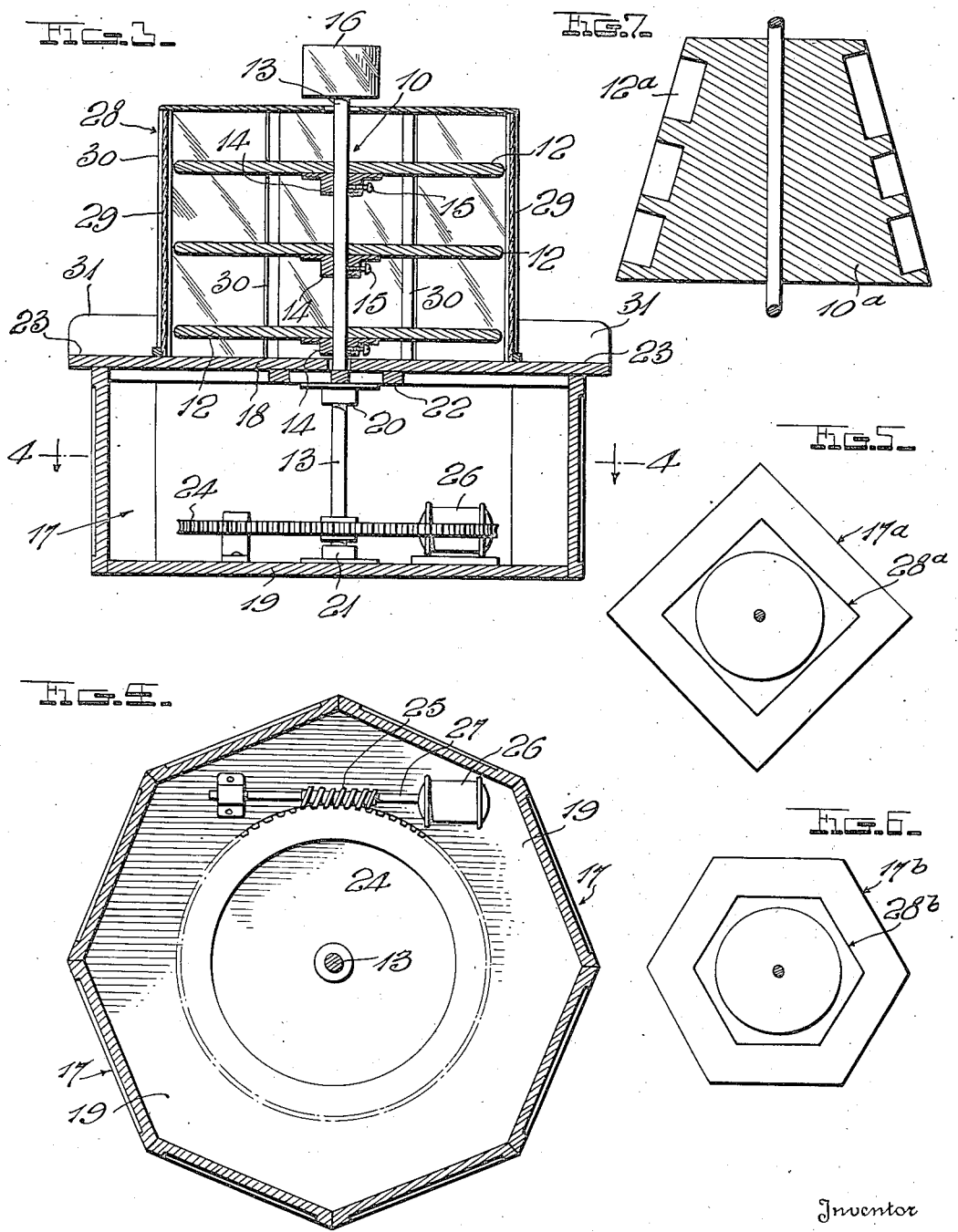

2,044,518

UNITED STATES PATENT OFFICE 2,044,518

MERCHANDISE DISPLAY AND ORDERING DEVICE

Charles Henry Thorstensen, Ogden, Utah, assignor to Rotary Patented Displays, Inc., Ogden, Utah, a corporation of Utah Application November 5, 1935, Serial No. 48,409

2 Claims. (Cl. 312—135)

The invention aims to provide a new and improved device for use in stores, dispensaries and the like, enabling patrons to readily inspect samples of merchandise and aiding them in filling out order blanks or otherwise writing orders for the merchandise after inspection of the displayed samples, and the invention makes possible a new system of merchandise distribution designed to save time, to stimulate sales, to eliminate wasteful expense on the part of the seller, to assist the buyer in his selection of merchandise without the aid of sales people, to save space and to better control the merchandise involved, etc. The system saves time in that the purchaser goes directly to the display and ordering device displaying the merchandise in which he is interested, each device being preferably marked conspicuously with the class of goods on display therein. There is no unnecessary conversation or "high pressure" selling and no slips must be made out by clerks. The system saves expense by eliminating sales people and by obviating the necessity of rearranging the stock after sale is made. After the patron writes the order, he pays the required amount to a cashier who returns the order slip stamped paid. He takes this slip to a stock clerk who fills the order and keeps the slip for record. The system thus allows better control of merchandise as a perpetual inventory is easily maintained through forms made out by customers. All money is handled through a cashier and stock is maintained for facility instead of display. The display devices may be made of any size or sizes suitable for the merchandise and the store and eliminate the necessity of other costly counters, display racks, etc. occupying much more space. The system aids materially in turn-over as slow moving merchandise is easier to eliminate.

Fig. 1 of the accompanying drawings is a side elevation showing one form of the invention.

Fig. 2 is a horizontal sectional view on line 2—2 of Fig. 1.

Fig. 3 is a vertical sectional view on line 3—3 of Fig. 2.

Fig. 4 is a horizontal sectional view on line 4—4 of Fig. 3.

Figs. 5 and 6 are diagrammatic horizontal sectional views illustrating two more of the many contours which the device may possess.

Fig. 7 is a vertical sectional view showing a different form of display rack.

Fig. 8 is a side elevation showing still another form of display rack.

Fig. 9 is a top plan view of the rack shown in Fig. 8.

While general construction now considered preferred, has been illustrated in the drawings, it is to be understood that numerous variations may be made within the scope of the invention as claimed. The construction shown in Figs. 1 to 4 will first be described and the variations illustrated by other views will then be explained.

A rotatable rack 10 is provided to display the samples of merchandise 11, each sample being plainly marked with description and price and usually with a code number. The rack 10 is shown as consisting of a plurality of vertically spaced shelves 12 centrally mounted upon a vertical shaft 13 to which they may be adjustably connected by any suitable means 14—15. The upper end of this shaft may well carry an illuminated sign 16 showing the character of merchandise displayed on the subjacent shelves. Thus, anyone entering a store or the like provided with a plurality of cabinets and ordering devices, may readily locate the one displaying the merchandise in which he is interested.

The rotary display rack 10 is mounted over a relatively large hollow base 17 whose top 18 and bottom 19 may well carry bearings 20 and 21 for the lower portion of the shaft 13, said top 18 being preferably provided on its lower side with a plurality of radial supports or braces 22. The top 18 projects radially beyond the display rack 10 and its projecting portion constitutes a plurality of desks 23 in fixed relation with said rack and disposed around the same for use by the patrons in filling out order slips or otherwise writing orders for the merchandise after inspecting the displayed samples 11.

Housed within the base 17, are appropriate driving means for the shaft 13 to slowly rotate the display rack 10 allowing convenient inspection of the samples. For illustrative purposes, I have shown a worm wheel 24 secured on the shaft 13 within the base 17, a worm 25 meshing with said worm wheel and an electric motor 26 for driving the shaft 27 which carries said worm. Portions of the base not occupied by the driving means may well be employed for storage purposes if desired.

A transparent case 28 is preferably provided around the display rack 10. In the present disclosure, this case includes transparent vertical panels 29 and vertical dividers 30 between said panels, and the top 18 of the base 17 is provided with dividing walls 31 which radiate from said dividers 30, segregating the desks 23 from each other. One or more of the panels 29 may be hinged or otherwise mounted as shown at 32, allowing outward movement thereof when it is necessary to initially place the samples on the rack 10 or desirable to rearrange them, possibly adding others and removing samples of goods which have not been good sellers. Suitable latches, locks or the like (not shown) will of course be employed for holding the movable panels in closed position.

The base 17 and the case 28 shown in Figs. 1 to 4, are of octagonal form but the invention is not restricted to this configuration nor to any other. For illustrative purposes, I have shown a square base 17$^a$ and a square case 28$^a$ in Fig. 5, and in Fig. 6 have illustrated a hexagonal base 17$^b$ and a correspondingly shaped case 28$^b$.

The rotatable display rack may be of any desired construction and shape. The rack 10 shown in Figs. 1 to 4 consists of a vertical shaft and shelves as above explained, but in Fig. 7 I have illustrated a frustoconical display rack 10$^a$ having peripheral pockets 12$^a$ in which to place the samples, and in Figs. 8 and 9, a rack 10$^b$ is shown having concentric steps 12$^b$ for the samples.

From the foregoing taken in connection with the accompanying drawings, it will be seen that novel and advantageous provision has been made for carrying out the object of the invention, and attention is again invited to the possibility of making numerous variations within the scope of said invention as claimed.

I claim:—

1. A merchandise display and ordering device comprising a rotatable rack upon which samples of the goods are displayed, a hollow base over the central portion of which said rack is mounted, said hollow base having a top projecting radially from said rack and constituting desks for use by the patrons in writing orders for the merchandise after inspecting the displayed samples, a transparent case carried by said base and enclosing said rack, and means housed within said hollow base for slowly rotating said rack.

2. A structure as specified in claim 1, said case having a plurality of vertical transparent panels and vertical dividers between said panels, said top of said base being provided with dividers radiating from the aforesaid dividers and segregating said desks from each other.

CHARLES HENRY THORSTENSEN.